United States Patent

[11] 3,631,730

[72] Inventors Howard D. Hadler;
Andrew Blaauw, both of Winneconne, Wis.
[21] Appl. No. 72,369
[22] Filed Sept. 15, 1970
[45] Patented Jan. 4, 1972
[73] Assignee J. I. Case Company
Racine, Wis.

[54] FRICTION DRIVE TRANSMISSION MECHANISM
6 Claims, 3 Drawing Figs.

[52] U.S. Cl. .................................................. 74/194, 74/213
[51] Int. Cl. .................................................. F16h 15/08, F16h 13/10
[50] Field of Search ........................................... 74/197, 194, 213

[56] References Cited
UNITED STATES PATENTS
1,963,880  6/1934  Barthelemy ................. 74/197 X
3,255,834  6/1966  Snavely ..................... 74/213 X Primary Examiner—Leonard H. Gerin
Attorney—Cullen, Settle, Sloman & Cantor ABSTRACT: A variable speed forward and reverse friction drive mechanism composed of a driving disc which has a lateral friction surface for selective engagement with either one of a pair of driven friction discs, which are supported on an output drive shaft for transmittal of rotational driving power from the driving disc to the driven discs when engaged by the drive disc; the improved construction of the arrangement is such that (1) either one or both of the driven discs are shiftable along the output drive shaft for varying the drive engaging position on the driving disc to obtain infinite variations in speed ratio, (2) the driven discs are pivotally supported relative to a stationary axis of the driving disc for selective engagement of one driven disc at a time and (3) the driving disc may be pivotally supported relative to a stationary axis around which the driven discs rotate for selective drive engagement with either one of the driven discs.

INVENTORS
HOWARD D. HADLER.
ANDREW BLAAUW.
BY
CULLEN, SETTLE, SLOMAN & CANTOR.
ATT'YS.

INVENTORS
HOWARD D. HADLER.
ANDREW BLAAUW.
BY
CULLEN, SETTLE, SLOMAN & CANTOR.
ATT'YS.

FRICTION DRIVE TRANSMISSION MECHANISM

BACKGROUND AND SUMMARY OF THE INVENTION

The present invention relates to variable speed transmissions and more in particular to a variable speed friction drive transmission of using friction surfaces for the transmission of driving torque and having means for varying the point of driving contact between the driving and the driven friction surfaces for infinite variation of the speed ratio between the driving friction surface and the driven friction surface.

The present invention, although of general utility, is particularly applicable for transmission of driving power from a prime mover to the wheels of a vehicle or to other driven members, such as implements carried by the vehicle and is of particular advantage for incorporation in small-type, self-propelled vehicles, such as garden-type tractors, riding mowers, etc.

A variety of principles have been used herebefore, for variable speed transmissions in such type of vehicles of which one of these, consists of friction gearings to provide infinite speed variations. The characteristics of many friction gear mechanisms are such, that the friction between the friction surfaces, resisting movement of one friction gear relative to another, is prohibitive because of heavy contact pressure required to produce sufficient, power transmitting torque.

In conventional friction drive transmission gearings, usually one driving disc is provided, adapted to frictionally engage a driven disc which is shiftable in a lateral direction along the friction surface of the driving disc and which, when positioned on one side of the driving axis of the driving disc, provides forward rotation and when positioned on the other side of the driving axis provides reverse rotation of the mechanism. This arrangement requires complicated support and shifting means for the driven disc in order to move the driven disc from one side of he driving axis to the other side of the driving axis. Furthermore, shifting of the driven disc from one side of the driving axis to the other side requires intermittent disengagement of the driving disc to prevent shock loads to occur in the mechanism which consequently requires additional elements and structures for the driving disc to be shifted intermittently out of engagement with the driven disc, thus, the driving disc in these conventional arrangements, must be axially shiftably supported, which in turn requires force storage means, such as springs or the like, to maintain the driving disc in torque transmitting engagement against the driven disc.

Friction drive transmissions are known, which, instead of one driven disc, embody a pair of driven discs supported on the same shaft, of which one is located to one side of the axis of the driving disc and the other at the other side of the axis of the driving disc. One of the driven discs, and generally the disc which provides forward drive transmission, is made shiftable along the shaft to vary the point of driving contact with the driving disc for infinite speed variations. In these known friction drive mechanism embodying a pair of driven discs for selective forward or reverse rotation of the output drive shaft, similar difficulties have been encountered in the arrangement and construction of means to simply and effectively obtain sufficient torque transmitting engagement of the driving disc with either the forward or reverse driven disc, which, in general requires clutch means associated with either driven disc to selectively establish or interrupt torque-transmitting driving contact with the driven disc ultimately resulting in the necessity of providing additional linkage and lever means for operation of the clutch mechanism.

The present invention provides an improved simplified friction drive transmission mechanism embodying a pair of driven discs supported on a common drive shaft adapted to be selectively placed in torque-transmitting driving contact with the driving disc by a simple mechanism to overcome the above-mentioned difficulties of known friction drive transmissions.

The improved friction drive transmission of the present invention provides, as its basic feature, a shuttle-type forward and reverse drive. A pair of driven friction discs are mounted on a drive shaft or output shaft of the transmission which is pivotally supported at one point between the pair of discs to selectively permit one or the other disc to contact the driving disc, which is supported along an axially stationary axis. The pivoted drive shaft, on which the driven discs are supported, has a simple push-pull linkage attachment connected to a control lever in the operators compartment of the apparatus or vehicle which permits pivoting of the shaft from (1) a neutral position, in which neither driven disc engages the driving disc, to (2) a forward position engaging the forward drive disc with the driving disc by pivoting the shaft in one direction, and (3) to reverse driving position by disengaging the forward drive disc and engaging the reverse drive disc with the driving disc by pivoting of the shaft in the opposite direction.

The driven disc, providing forward drive transmission, is supported for longitudinal movement along the drive shaft or output shaft so as to vary the point of driving contact along the friction surface of the driving disc for infinite speed variation. The driven disc for reverse drive of the transmission can be either stationary on the shaft to provide a single speed ratio in reverse, which usually is sufficient, or, selectively, the reverse disc can likewise be made shiftable along the drive shaft, either separate from or in conjoined movement with the shifting of the forward disc along the shaft to obtain a variety of speed ratios in forward and reverse.

In a further embodiment of the present improved friction drive transmission instead of pivotally moving the driven disc into or out of engagement with the driving disc, the driving disc is pivotally supported in a stationary member and attached to a rod linkage, bellcrank linkage, push-pull cable or the like, to selectively pivotally move the driving disc into or out of engagement with a selected driven disc supported on the drive shaft, which is stationary along its axis. In this arrangement, likewise, either or both forward and/or reverse driven disc can be made shiftable along the drive shaft for speed ratio change in the forward drive direction or in both forward and reverse drive direction.

A particular feature of the present improved friction drive transmission is that it is constructed such as to require the operator to maintain a manual force on the shift lever which establishes frictional driving contact between the driving disc and the selected driven disc and to continue this force as long as either driven disc is engaged with the driving disc for maximum driving torque. This arrangement provides a desired "-deadman" safety feature, not normally practical or feasible in most friction drive transmissions now commonly used in small self-propelled vehicles.

Further advantages and additional particular features of the present improved friction drive transmission will become apparent by reference to the following detailed description in connection with the appended drawings illustrating several preferred embodiments of the invention.

DESCRIPTION OF THE PREFERRED EMBODIMENTS

Figure 1:
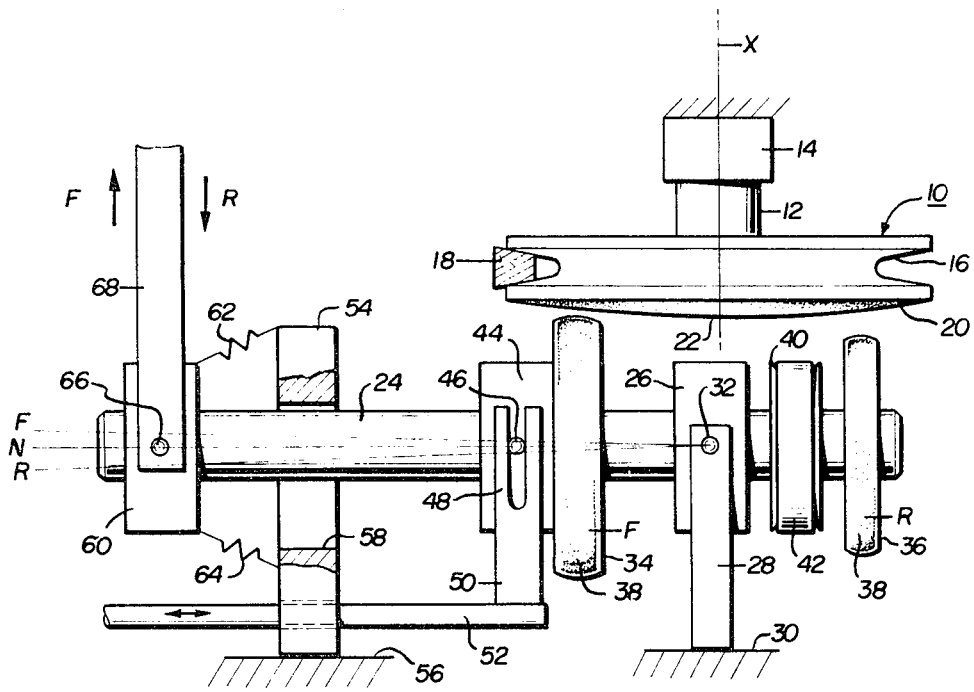
FIG. 1 is a schematic illustration of one embodiment of the present improved friction drive transmission illustrating a pivotal output drive shaft.

With reference to FIG. 1 in the drawings, the driving disc is generally indicated by the numeral 10 which, for example may comprise a pulley rotatable by means of a shaft 12 within a bearing block 14 which is a stationary part of the machine or vehicle (not shown) in which the transmission is being utilized. The pulley 10 has a groove 16 to receive a transmission belt 18 which, as is common practice, is drivingly connected to the output of a prime mover (not shown) of the respective apparatus or vehicle to rotate the disc 10 at a selected speed. It will be understood as the disc 10 may comprise any other kind of commonly used driving wheel, such as a gear or the like, or the disc 10 may be a plain disc and the shaft 12 may be driven by any conventional driving arrangement.

The driving disc 10 has a lateral friction surface 20, which, as shown, is dished or convex providing a crown portion 22 substantially disposed along the central axis "X" of the driving disc 10.

Positioned forwardly of the friction surface 20 of the driving disc 10 is an output drive shaft 24, extending in a direction normal to the axis "X" of the driving disc. The output drive shaft 24 is supported for rotation within a bearing block 26 positioned substantially along the central axis of the driving disc 10 and which is secured to a support member 28 which is stationarily attached to a part 30 of the respective apparatus or vehicle.

The output drive shaft 24 is pivotal relative to the central axis "X" of the driving disc 10 by means of the pivot 32 by which the bearing block 26 is attached to the support member 28. The output drive shaft 24 supports a pair of driven discs 34 and 36 respectively, which are spaced along the shaft to both sides of the central axis "X" of the driving disc 10. The driven discs 34 and 36 are suitably secured to the drive shaft 24 for rotation therewith by means of keys, serrations, splines or the like, as is common practice, and each having a radial friction surface 38 for selective driving engagement with the friction surface 20 of the driving disc 10, by means to be described hereafter.

The output drive shaft 24 further supports for rotation therewith a driven member, such as a pulley 40 or the like, which is engaged by a transmission belt 42 for transmission of driving torque from the output drive shaft 24 to a driven device such as the wheels of a vehicle, attachment drive or implement carried by the vehicle or the like.

Figure 2:
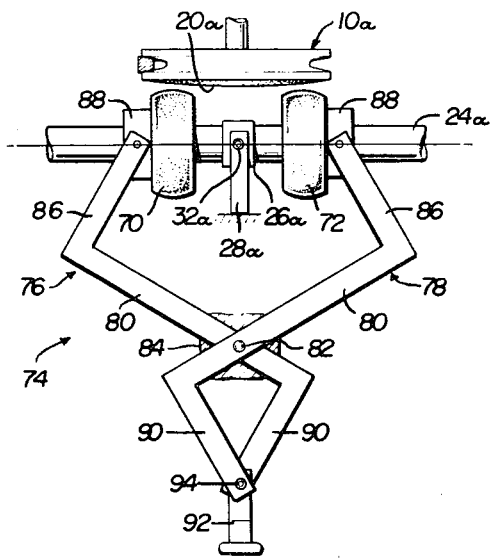
FIG. 2 is a schematic illustration of a further embodiment of the present improved friction drive transmission illustrating a pivotal output drive shaft and both driven discs being arranged for shifting along the drive shaft by a common linkage arrangement.
Figure 3:
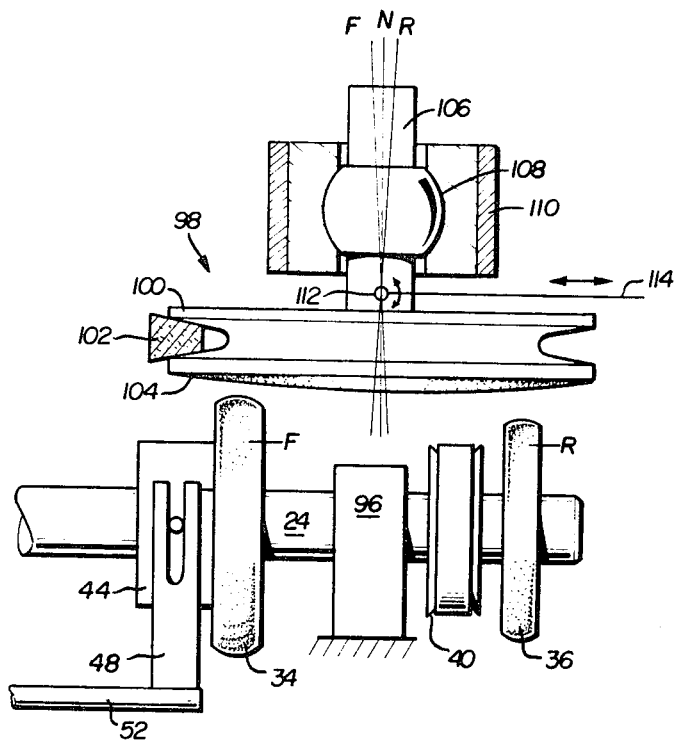
FIG. 3, is another schematic illustration of a still further embodiment of the present improved friction drive transmission illustrating a pivotal driving disc.

In the embodiment shown in FIG. 1, for example, the driven disc 34 is the forward drive disc and the driven disc 38 constitutes the reverse drive disc, however, it will be obvious that this arrangement can be reversed and, similarly, although the driven disc 34 for the forward drive is shown to be of larger diameter than the driven disc 36, they could be of equal diameter, as shown in the embodiments of FIG. 2 and 3. These dimensions depend totally on application requirements and thus are subject to variations in design.

The forward drive disc 34 is provided with a hub or collar extension 44 from which extends a transverse pin 46 adapted to receive the forked end 48 of a shift lever 50 which is suitably attached to a link 52 providing a push-pull linkage for longitudinal shifting of the driven disc 34 along the output drive shaft 24. The link 52 which may be a bowden push-pull cable or any other conventional linkage, extends through a support member 54 which is stationarily attached to a part 56 of the apparatus or vehicle (not shown) carrying the transmission and is provided at the other end with a suitable control lever (not shown) for manipulation by the operator of the apparatus or vehicle.

The support member 54 also supports the output drive shaft 24 within a slot 58 to permit pivotal movement of the drive shaft 24 around the pivot 32. The free end of the drive shaft 24 extends outwardly of the support member 54 and into another bearing block 60 which is floatingly connected to the support member 54 by means of opposite spring members 62 and 64, respectively, which are force-balanced and arranged such as to normally tend to return and retain the drive shaft 24 in the neutral position, shown in FIG. 1, in which neither of the driven discs 34 or 36 is drivingly engaged with the driving disc 10.

The bearing block 60, which supports the free end of the pivotal output drive shaft 24, is connected by means of a pivot pin 66 to a linkage indicated at 68 which, similarly, is provided at its other end with a suitable control lever (not shown) as is common practice, for manipulation by the operator of the apparatus or vehicle. The linkage 68, conventionally, may be a push-pull rod, bowden cable or may have a bellcrank lever arrangement as desired, and as is commonly determined by the particular installation requirements connected with the particular apparatus or vehicle in which the present improved transmission is utilized.

Thus, it will be understood that, when the linkage 68 is manipulated in the pull direction indicated by the arrow "F," the output drive shaft 24 will be pivoted around the pivot 32 to move the driven disc 34 into frictional contact against the friction surface 20 of the driving disc 10 for rotation of the drive shaft 24 in a forward direction when the driving disc 10 is rotated by means of the transmission belt 18. By means of manipulation of the linkage 52, the driven disc 34 is shifted along the drive shaft 24 to vary the driving contact of the friction surface 38 of the driven disc along the surface 20 of the driving disc, from the radial outer end of the disc towards the axial center of the disc, and vice versa, to obtain a variety of infinite speed ratios, as will be understood. Shifting of the driven disc 34 along the friction surface 20 of the driving disc can be done without interrupting the driving engagement between the discs.

Manipulation of the linkage 68 in the push direction indicated by the arrow "R," pivots the driving shaft 24 in the opposite direction around the pivot pin 32 to move the forward drive disc 34 out of engagement with the driving disc 10 and establishing engagement of the reverse drive disc 36 with the friction surface 20 of the driving disc to place the transmission in reverse drive at a fixed, single-speed ratio, as seen in the embodiment in FIG. 1 in which, for example, the driven disc 36 is fixed on the output drive shaft 24. It will be understood, however, that the driven disc 36 may likewise be made adjustable along the drive shaft 24 by a similar shift arrangement as provided for the driven disc 34 to obtain variations in speed ratio in reverse drive.

The resiliently suspended free end of the output drive shaft 24, is solely supported within the slot 58 of the support member 54 by the balanced springs 62 and 64 which are arranged such, in oppositely biased direction, as to continuously tend to pull the output drive shaft 24 into the neutral position shown in FIG. 1. Thus, when the drive shaft 24 is pivoted in either the forward drive direction (arrow "E") or pivoted in the reverse drive direction (arrow "R"), the respective spring 62 or 64 which is located opposite from that direction, will be extended, thereby exerting a force on the free end of the pivoted drive shaft 24 tending to return the drive shaft 24 into the neutral position. Consequently, a force must be maintained on the linkage 68 when the shaft is pivoted in either direction, to maintain either driven disc 34 or 36 in frictional driving contact with the driving disc 10. This force on the linkage 68 could be by means such as a positive locking arrangement to lock the linkage in the desired position. Any such locking arrangement, however, particularly in the forward drive direction, must be designed so as not to adversely affect the desirable infinite speed ratio change desired to be obtained in the friction drive arrangement.

In the present improved friction drive, when incorporated for instance in a tractor or the like, the linkage 68 is preferably not positively locked, either in the forward of reverse driving direction, so that the operator of the apparatus or vehicle in which the transmission is installed is required to manually maintain a force on the linkage 68 to keep the friction discs 34 or 36, respectively, in torque-transmitting driving engagement with the driving disc 10, to thereby provide a desirable "deadman" safety feature so that, when the force on the linkage is released due to a sudden incapacity of the operator, the balanced spring arrangement 62, 64 functions to return the output drive shaft 24 to its neutral position, thereby disengaging the drive and slowing the apparatus or vehicle to a stop.

Referring now to the embodiment schematically illustrated in FIG. 2, a driving disc is illustrated at 10a, which may be similarly supported for rotation as illustrated in FIG. 1, and may comprise a pulley or any other rotatable driving member having a lateral convex friction surface 20a.

An output drive shaft 24a is positioned in front of the friction surface 20a along a direction transverse to the axis of the driving disc 10a and which is suitably rotatably supported along the axis of the driving disc within a bearing block 26a which is pivoted at 32a to a stationary support member 28a. The rotatable drive shaft 24a supports a pair of driven friction discs 70 and 72, respectively, at both sides of the shaft bearing block 26a for selective engagement with the driving disc 10a by respective pivoting of the shaft 24a. The direction disc 70, in this embodiment, when engaged with the driving disc 10a provides the forward drive, whereas the friction disc 72, when engaged with the driving disc 10a, provides the reverse drive. Both driven discs 70 and 72 are slidably supported along the shaft 24a to obtain variable speed ratios in both forward and reverse drive.

The forward and reverse drive discs 70 and 72 are interconnected by a correlated linkage mechanism, generally indicated at 74, which provides simultaneous shifting of the driven discs along the shaft 24a in opposite directions relative to each other, so that both driven discs are shifted simultaneously towards or away from the axial center of the driving disc and equal distance to another so that, when shifting from one direction of rotation to another, the apparatus or vehicle will be propelled at the same speed.

It will be understood that the output drive shaft 24a, in this embodiment, likewise carries a torque-transmitting driven member such as 40 in FIG. 1, for transmission of driving torque to the driven device or to the wheels of the vehicle. And, similarly, the free end of the shaft 24a is attached to a linkage such as 60, 66 and 68 shown in FIG. 1, and is similarly suspended by means of a pair of balancing springs (62, 64 in FIG. 1), which normally tend to retain the shaft 24a in neutral position as previously explained in connection with the description of the FIG. 1 embodiment.

The dual-acting linkage arrangement 74, in this embodiment, for simultaneous shifting of the driven discs 70 and 72 along the drive shaft 24a is comprised of a pair of oppositely disposed levers 76 and 78, respectively. Each of the levers 76 and 78 has an intermediate portion 80 which are disposed to cross each other adjacent one end of the intermediate portions 80 at which the levers are pivotally connected to each other by means of a pivot pin 82 supported in a stationary part 84 of the apparatus or vehicle. Each of the intermediate lever portions 80 culminate at the ends directed towards the drive shaft 24a, in oppositely directed arm portions 86 extending from the intermediate portions 80 at substantially a right-angle in opposite direction for pivotal connection to the shift collar 88 of each of the driven discs 70 and 72.

The other ends of the intermediate portions 80 of the levers 76 and 78, extend into links 90 disposed substantially at a right-angle to the intermediate portions 80 from which they extend towards each other in a direction opposite to the direction of extension of the arms 86. The ends of the link extensions 90 of the levers 76 and 78 are pivotally connected to each other and to an actuating member 92 by means of a pivot pin 94.

Thus, the shift levers 76 and 78, which are identical to each other except for being disposed in reverse order, are pivotally connected on a common pivot pin to a stationary part and are further pivotally connected to each other at their remote actuating end, for simultaneous actuation by means which may comprise a rod or push-pull cable or the like conventional member, adapted for manipulation by the operator of the apparatus or vehicle. Thus, when it is desired to shift either driven disc 70 or 72, which at that time is in driving engagement with the driving disc 10a by means of respective pivotal movement of the output drive shaft 24a, the actuating member 92 is manipulated in either a push or pull direction to exert a force on the connecting links 90, causing the levers 76, 78 to be pivoted around the stationary pivot pin 82, in op-posite direction, to thereby simultaneously move the driven discs 70 and 72 towards or away from each other an equal amount along the drive shaft 24a. By this arrangement, infinite speed variations are provided for both forward and reverse drive and such that, when the drive is changed from forward to reverse, or vice versa, the speed ratio set by the driven disc previously engaged with the driving disc, remains the same. Pivoting of the drive shaft 24a for selective driving engagement of either driven disc 70 or 72, does not change the geometry of the shift linkage 74, since both levers 76 and 78 will be moved an equal distance in opposite directions.

With reference now to the embodiment illustrated in FIG. 3, there is illustrated an output drive shaft 24 supported at one end for rotation within a bearing block 96 which is secured to a stationary part of the apparatus or vehicle. The output drive shaft 24, similar to the embodiment in FIG. 1, carries a forward drive disc 48 which is supported for shiftable movement along the drive shaft 34, as previously explained, and a reverse drive disc 36 spaced on opposite sides of the shaft bearing support 96. The shaft 24, likewise, carries a driven member 40 in the form of a pulley or the like, for transmission of driving torque from the shaft 24 to the driven device of the apparatus or vehicle.

The output drive shaft 24 is disposed along stationary axis normal to the axis "N" of the driving disc assembly 98 disposed adjacent thereto.

The driving disc assembly 98, in this embodiment, is composed of a driving disc 100, which may comprise any kind of a rotatable member such as a gear and, as shown herein, comprises a pulley drivingly connected to a transmission belt 102 which receives driving power from the prime mover (not shown) of the apparatus or vehicle. The driving disc 100 has a lateral friction surface 104 for selective frictional driving engagement with either one of the driven discs.

The driving discs 100 is provided with a stub shaft 106 at the other side of the driving disc, and extending along the central axis "N" thereof. The stub shaft 106, for example, is rotatably supported in a spherical bearing member 108 which is secured within a stationary part 110 of the apparatus. Thus, the stub shaft 106, and thereby the driving disc 100 is pivotable within the spherical bearing 108 between set limits in both directions, defined by the structure of the spherical bearing member, for selective frictional driving engagement with either of the driven discs 34 or 36.

In order to pivot the driving disc 100 in selective driving engagement with either driven disc, the stub shaft 106 is pivotally connected at 112 by any known conventional means (not shown) but which may be similar to the arrangement 60, 66 provided for the rotatable drive shaft 24 in FIG. 1, to a linkage 114 adapted to be manipulated by the operator of the apparatus or vehicle. The linkage 114 will take any desired form such as a rod, push-pull cable, bellcrank lever or the like, commonly employed in these type of applications. Thus, when the linkage 114 is actuated in a pulling direction the driving disc 100 is pivoted to displace the central axis "N" of the stub shaft 106, which indicates neutral, to the position "F" in which the friction surface 104 of the driving disc engages the forward drive disc 34.

When the linkage 114 is manipulated in the push direction, the driving disc 100 will be pivoted to displace the central axis "N" of the stub shaft 106 to the position "R" in which the driving disc drivingly engages the rear drive disc 36.

Obviously, the pivotable driving disc assembly 98 may be likewise arranged such as to continuously bias the assembly into neutral position along the axis "N," in which neither driven disc is engaged, by means similar to the means shown for that purpose in the embodiment of FIG. 1, to thereby require the operator of the apparatus or vehicle to manually maintain a force on the linkage 114 for continuous driving engagement in either forward or reverse driving position. Thus, the same "deadman" feature, described in connection with the embodiment in FIG. 1, can be likewise provided for in the embodiment of FIG. 3.

It will be obvious from the foregoing description and by the illustrations in the drawings, that the present invention provides an improved friction drive transmission, particularly adaptable for small self-propelled vehicles, although not necessarily limited to this application.

By means of the pivotal arrangement of either the output drive shaft, which carries the driven forward and reverse disc, or pivotal arrangement of the driving disc, a quick changeover from one direction of rotation to the other is made possible, without necessity of having to disengage the drive transmission thus, no separate clutch means are necessary for either the driving disc or the driven discs.

The present invention further provides a desirable "deadman" safety feature by provision of requiring the operator to manually maintain the engagement force between the driving disc and the respective driven disc, due to the arrangement of balanced biasing means which tend to continuously urge the pivotable member in a neutral, that is disengaged, position. This arrangement further eliminates conventional mechanical force-transmitting means, such as springs or the like, normally employed in conventional friction drive transmissions to maintain torque-transmitting driving connection between the driving and the driven member. Obviously, the manual engagement force to be exerted by the operator in the present improved friction drive transmission, is far more efficient to obtain maximum driving torque and to prevent slippage between the driving and driven member.

Although the present invention has been described in connection with several schematically illustrated embodiments, it will be obvious to anyone skilled in the art to which the present invention pertains, that various changes in design and structural details may be made without departing from the spirit and essential characteristic of the invention as defined by the scope of the appended claims.

We claim:

1. A variable speed friction drive transmission comprising: a first drive assembly composed of a rotatable driving member having a friction surface and rotatably supported along an axis; a second drive assembly composed of a pair of driven members disposed adjacent said friction surface of said driving member on a shaft for rotation of said shaft; said shaft being normally disposed along an axis intersecting the axis of the driving member; each of said driven members being located on said shaft at opposite sides of said axis of the driving member; said driven members being adapted for selective torque-transmitting driving engagement with said driving member; means to selectively longitudinally displace at least one of said driven members along said shaft towards or away from said axis of said driving member to thereby vary the point of frictional contact of said one driven member along said friction surface of said driving disc; first means to selectively pivotally displace one of said drive assemblies into frictional driving engagement with the other of said drive assemblies for transmission of drive torque from said driving member to said shaft and second means associated with said first means to normally urge said one drive assembly in the neutral nonengaged position.

2. In the transmission as defined in claim 1, said means to longitudinally displace said driven members along said shaft comprising a pair of identical cross-connected levers stationarily pivotally connected at their point of intersection and each having one of their ends pivotally connected to a respective one of said driven members at opposite sides thereof, the other ends of said cross-connected levers being pivotally connected to each other and to an actuator such that, when said actuator is manipulated said levers will be pivoted in opposite directions an equal distance around the pivot point of intersection to thereby oppositely longitudinally displace said driven members an equal distance along said shaft to equally vary the relative point of frictional driving contact of the selected one of said driven members along the frictional surface of said driving member.

3. In a transmission as defined in claim 1, said first means comprising a stationary support; a pivot member carried by said support for pivotal movement relative thereto; said pivot member rotatably supporting said shaft adjacent one end thereof; an actuating linkage pivotally connected to the opposite end of said shaft to pivotally displace said shaft relative to said support; said second means comprising balanced biasing members attached between the opposite end of said shaft and said stationary support to normally urge said shaft into a position relative to said driving member in which neither of said driven members is in engagement with said driving member; said linkage being freely floating to cause the application of a continuous force on said linkage to maintain said shaft in a selected pivoted position for continuous driving engagement of one of said driven members with said driving member.

4. In the transmission as defined in claim 1, said first means comprising a stationary support; a pivotal bearing member retained within said support adapted to rotatably receive a shaft carried by said driving member; and means comprising a linkage pivotally connected to said driving member to pivotally selectively displace said driving member into frictional driving contact with a selected one of said driven members.

5. In combination with an apparatus having a prime mover and a rotatable member to be driven by said prime mover, the improvement comprising: said rotatably driving member being supported in the apparatus along an axis; a transmission shaft supported for rotation within the apparatus and disposed adjacent said driving member along an axis intersecting the axis of said driving member; at least one driven member supported on said shaft for selective frictional driving engagement with said driving member; means pivotally supporting said shaft; linkage means to pivot said shaft to cause selective driving engagement of said driving member with a driven member; and means to normally continue to urge said shaft into a position disengaging said driven member from said driving member.

6. In combination with an apparatus having a prime mover and a rotatable driving member to be driven by said prime mover, the improvement comprising: said rotatable driving member being supported in said apparatus along an axis, a transmission shaft being supported for rotation within said apparatus and disposed adjacent said driving member along an axis intersecting the axis of said driving member, at least one driven member supported on said shaft for selective frictional driving engagement with said driving member, means pivotally supporting said driving member within said apparatus for selective driving engagement with a selected one of said driven members; and biasing means freely supporting said driving member to normally continuously urge said driving member out of engagement with said driven member.

* * * * *